(No Model.)
J. S. SELLON.
SECONDARY BATTERY.
No. 324,597. Patented Aug. 18, 1885.
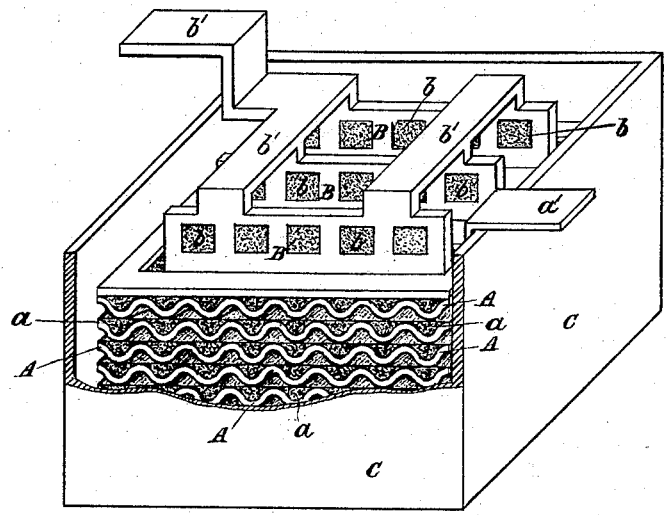

UNITED STATES PATENT OFFICE.

JOHN SCUDAMORE SELLON, OF HATTON GARDEN, COUNTY OF MIDDLESEX, ENGLAND.

SECONDARY BATTERY.

SPECIFICATION forming part of Letters Patent No. 324,597, dated August 18, 1885.

Application filed March 27, 1885. (No model.) Patented in England February 9, 1885, No. 1,764.

*To all whom it may concern:*

Be it known that I, JOHN SCUDAMORE SELLON, gentleman, a subject of the Queen of Great Britain and Ireland, and residing at Hatton Garden, in the county of Middlesex, England, have invented certain Improvements in Secondary Batteries, (for which I have applied for patents in Great Britain on the 9th February, 1885, No. 1,764, France on the 5th of March, 1885, and Germany on the 11th of March, 1885,) of which the following is a specification.

The objects of my invention are to insure the better working of secondary batteries, to obviate the occurrence of contacts between the negative and positive elements or plates thereof by the said elements or plates coming into contact with each other at any point or points, or by the falling of active material off from or out of the said elements or plates, to obtain arrangements by which the plate or plates of either pole in a cell may be with facility removed for any required purpose and be readily replaced, and also to provide an effective and economical battery occupying a minimum of space.

In carrying my invention into effect I employ any suitable form or construction of the individual elements or plates, (which may be made of any suitable metal or material,) such, for example, as plain plates or pieces, frames or grids formed with shelves or laminæ, or plates ribbed, perforated, interstitial, corrugated, fluted, indented, cellular, or roughened, or plates "formed" by any electro-chemical process, or any combination of the same or analogous forms, and of any suitable general figure or shape—such, for example, as flat, conical, annular, cup-like rod-shaped, tubular, or any combination of such shapes, or any other suitable or convenient shape for the respective elements, and whether or not having material to be rendered active deposited upon or in them, or whether or not packed or partially packed with any suitable material to be rendered active, (such, for instance, as oxides of lead, or lead-foil, or spongy lead, or lead in any fine state of division,) or in conjunction with such material in layers or blocks, and with suitable arrangements for effecting the diffusion of the electrolyte, and for the escape of the gases; and I so arrange them that the elements or plates of one pole are transverse to the elements or plates of the other pole. Thus, for instance, the positive-pole plates are preferably arranged in a horizontal position, and the negative-pole plates in a vertical or perpendicular position, or respectively in any equivalent convenient slanting position, so that the elements or plates of one pole are situated transversely to those of the other pole. By suitably making the connections of the respective sets of plates the perpendicular or slanting elements or plates forming one pole may be readily raised and removed from the cell without disturbing the horizontal or other set of elements or plates, and either set may thus be examined, replaced, or renewed with facility and convenience. With such an arrangement—say, for instance, with a set of corrugated and suitably-perforated horizontal plates at the positive pole, which, if required, may have active material deposited on or in or between them, or may be packed or have laminæ of metal attached to, in, or on them, and at the negative pole flat grid rod-shaped or tubular plates, or plates formed with disks or pieces which may also be suitably perforated and corrugated, and which may have active material deposited upon or packed in or between them, such negative-pole plates being suitably constructed so that they may be placed perpendicularly through openings in or between the positive-pole plates—it is scarcely possible for contacts to take place, or for the packed material (if used) to fall off from or out of the said plates or the openings or spaces therein, and should buckling of any of the plates occur, it will not cause short-circuiting.

The proportions of the respective elements as to their size and superficial area, and the amount of deposited or packed material, if used, may be carefully adjusted to give the best results.

The connections may be attached in any convenient manner; but, preferably, the connections of the positive-pole plates should be covered so far as possible by the electrolyte. I find this form also well suited for cases in which zinc negative-pole plates are employed in conjunction with lead positives, in order to obtain for instantaneous work a quick-acting battery of high electro-motive force.

In order that my invention may be properly understood, I have illustrated in the accompanying drawing a convenient arrangement according to my invention. I, however, wish it to be understood that I give this only as an illustration of the way in which my invention may be carried into effect, and that I do not in any way limit myself to the precise example here shown.

The accompanying drawing gives a general view of a cell constructed with corrugated and perforated plates A, laid horizontally and packed with active material $a$ in the upper corrugations. The lower corrugations are left free from packed material to allow of the ready diffusion of the electrolyte, but having been (preferably) roughened on the surface by a chemical or other process, so as to be rendered more effective. The plates are placed one upon the other, and connected up by conductors $a'$, forming the positive pole. The plates B, which (in this case) are grid-frames packed with active material $b$, are placed transversely through openings in the plates A, and are connected up by conductors $b'$, forming the negative pole, the cell being completed by the vessel C, containing the electrolyte.

I claim—

1. A secondary battery comprising a series of plates or elements constituting the positive pole or denomination, and a series of plates or elements constituting the negative pole or denomination, the latter being arranged transversely to the former, substantially as described.

2. A secondary battery comprising a series of horizontally-disposed plates or elements and a series of vertically-disposed plates or elements arranged in openings in the horizontal series, substantially as described.

3. In a secondary battery, the combination, with a vertically-disposed element, of a series of horizontally-disposed corrugated plates constituting the other element, said plates having their upper corrugations or grooves filled with active material, the lower grooves forming passages for the dispersion of the electrolyte, substantially as described.

In testimony whereof I have signed my name to this specification in the presence of two subscribing witnesses.

JOHN SCUDAMORE SELLON.

Witnesses:
RUDOLPH CHAS. NICKOL,
CHARLES W. NEWTON,
    *Both of* 31 *Lombard Street, London.*